(12) United States Patent
Olgaard

(10) Patent No.: US 9,078,165 B2
(45) Date of Patent: Jul. 7, 2015

(54) SYSTEM AND METHOD FOR CONFIRMING RADIO FREQUENCY (RF) SIGNAL CONNECTION INTEGRITY WITH MULTIPLE DEVICES UNDER TEST (DUTS) TO BE TESTED CONCURRENTLY

(71) Applicant: LITEPOINT CORPORATION, Sunnyvale, CA (US)

(72) Inventor: Christian Volf Olgaard, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 0 days.

(21) Appl. No.: 14/565,634

(22) Filed: Dec. 10, 2014

(65) Prior Publication Data

US 2015/0093998 A1    Apr. 2, 2015

Related U.S. Application Data

(62) Division of application No. 13/791,098, filed on Mar. 8, 2013.

(51) Int. Cl.
| | |
|---|---|
| H04B 17/00 | (2015.01) |
| G01R 27/00 | (2006.01) |
| G01R 23/00 | (2006.01) |
| H04W 24/08 | (2009.01) |
| H04B 17/17 | (2015.01) |
| H01Q 3/26 | (2006.01) |
| H04B 3/462 | (2015.01) |

(52) U.S. Cl.
CPC .............. *H04W 24/08* (2013.01); *H04B 17/00* (2013.01); *H04B 17/0085* (2013.01); *H04B 17/17* (2015.01); *H01Q 3/267* (2013.01); *H04B 3/462* (2013.01)

(58) Field of Classification Search
USPC ............. 455/67.11, 67.13, 67.14, 67.16, 67.7
See application file for complete search history.

(56) References Cited

U.S. PATENT DOCUMENTS

| | | |
|---|---|---|
| 2005/2024085 | 10/2005 | Inaba et al. |
| 2008/0144689 A1 | 6/2008 | Crouch et al. |

OTHER PUBLICATIONS

Anritsu Corporation, Vector Network Analyzer Primer, Application Note No. 11410-00387, Rev. B, published 2009.*
Agilent Technologies, Inc., Agilent Network Analyzer Basics, pp. 1-94, printed Aug. 31, 2004, 5965-7917E: cp.literature.agilent.com/litweb/pdf/5965-7917E.pdf.
U.S. Appl. No. 13/791,098, filed Mar. 8, 2013, "System and Method for Confirming Radio Frequency (RF) Signal Connection Integrity With Multiple Devices Under Test (DUTS) to be Tested Concurrently"; 39 Pages.
U.S. Appl. No. 13/791,127, filed Mar. 8, 2013, "System and Method for Confirming Radio Frequency (RF) Signal Connectivity With Device Under Test", 18 Pages.

* cited by examiner

*Primary Examiner* — Blane J Jackson
(74) *Attorney, Agent, or Firm* — Vedder Price, P.C.

(57) ABSTRACT

System and method for confirming radio frequency (RF) signal connections with multiple devices under test (DUTs) tested concurrently using replicas of a RF test signal. Cabled signal connections between the signal source and the DUTs are monitored by sensing levels of outgoing and related reflection RF signals. These signal levels are compared against similar signal levels when the outgoing RF signals are provided to reference impedances. Alternatively, the cabled signal connections have lengths of known signal wavelengths and the RF test signal frequency is swept such that minimum and maximum time delays between the outgoing and reflection RF signals go through minimum and maximum signal cycles with a difference of at least one full cycle. The reflection RF signal magnitude and phase are monitored, from which peak and valley signal level differences and phase changes are identified to determine return loss and phase changes indicative of DUT connection.

8 Claims, 13 Drawing Sheets

SYSTEM AND METHOD FOR CONFIRMING RADIO FREQUENCY (RF) SIGNAL CONNECTION INTEGRITY WITH MULTIPLE DEVICES UNDER TEST (DUTS) TO BE TESTED CONCURRENTLY

BACKGROUND

The present invention relates to systems and methods for testing multiple radio frequency (RF) signal transceivers concurrently, and in particular, to confirming RF signal connection integrity when testing such devices.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such devices, engineers take extraordinary care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal analyzer (VSA) for analyzing signals produced by the device, and a vector signal generator (VSG) for generating signals to be received by the device. The analyses performed by the VSA and the signals generated by the VSG are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of product cost is manufacturing test cost. Typically, there is a direct correlation between the cost of test and the time required to perform such test. Thus, innovations that can shorten test time without compromising test accuracy or increasing capital equipment costs (e.g., increasing costs due to increasing sophistication of test equipment, or testers) are important and can provide significant cost savings, particularly in view of the large numbers of such devices being manufactured and tested.

However, all systems and methods for testing such devices have one thing in common: RF signal connection integrity. Although the devices being tested, as discussed in more detail below, are wireless RF signal transceivers, testing is nonetheless conducted using cabled signal paths to ensure reliable and substantially lossless signal connections. Accordingly, if any of these conductive signal connections between a DUT and the test equipment used for performing the tests is shorted, open or experiences a significantly different signal impedance, any test results obtained will be suspect at best, and more generally of no value. Hence, it would be desirable for having test systems and methods for confirming RF signal connection integrity between the test equipment and each DUT being tested so as to ensure there are no shorted, open or mismatched impedance connections that can cause erroneous test results to be generated. Such connection confirmation would further enable monitoring and scheduling of events (e.g., powering up a DUT that has been confirmed as connected and thereby minimizing down time in a production test environment), as well as enable tracking of events (e.g., to compile a DUT connection history and thereby anticipate potential needs for repairs or maintenance within the testing environment).

Referring to FIG. 1, for example, a flow graph for a typical two-port RF signal network can be depicted as shown. Each port includes two nodes, one for the incident, or entering, wave and the other for the reflected, or leaving, wave to be conveyed via that signal port. (For purposes of this discussion, the incident and reflected nodes are identified by "a" and "b", respectively.) In this example, when the incident wave enters the device at Port 1, part of it will be returned through the $s_{11}$ path and $b_1$ node, while the remaining portion of the incident wave continues through the $s_{21}$ path and leaves the network via the $b_2$ node. If a device or load connected to Port 2 has signal reflections, e.g., due to mismatched impedances, it will reflect part of the wave leaving the $b_2$ node, with such reflected wave portion re-entering the network via the $a_2$ node. In turn, a portion of this may be reflected, passing via the $s_{22}$ path and leaving the network via the $b_2$ node. The remaining portion of the reflected wave continues on through the $s_{12}$ path and leaves the network via the $b_1$ node. Accordingly, an incident wave entering a network, e.g., via the $a_1$ node, can result in a reflected signal returning via the $b_1$ node. In accordance with well-known principles, this reflected signal component $b_1$ can be expressed in terms of the initial incident signal $a_1$, reflected signal $a_2$, and the network scattering perimeters associated with the $s_{11}$ path and $s_{12}$ path as follows: $b_1=a_1*s_{11}+a_2*s_{12}$. In the event that Port 2 experiences no signal reflections, e.g., by being attached to a matching impedance, there is no reflected signal entering at the $a_2$ node, and this expression simplifies to $b_1=a_1*s_{11}$. Hence, the ideal scenario occurs when impedances match, thereby minimizing the $s_{ii}$ component.

SUMMARY

In accordance with the presently claimed invention, a system and method are provided for confirming radio frequency (RF) signal connections with multiple devices under test (DUTs) to be tested concurrently using replicas of a RF test signal the. Cabled signal connections between the RF test signal source and the DUTs are monitored by sensing the signal levels of the outgoing, or incident, RF signals and the reflection RF signals each of which is related to a respective one of the outgoing RF signals. These signal levels can be compared against similar outgoing and reflection RF signal levels when the outgoing RF signals are provided to predetermined, or reference, load impedances. Alternatively, the cabled signal connections have lengths of known numbers of signal wavelengths and the RF test signal frequency can be swept such that minimum and maximum time delays between the related outgoing and reflection RF signals go through minimum and maximum numbers of signal cycles between which the difference is at least one full signal cycle over the test signal path. During such frequency sweep, the reflection RF signal is monitored for signal magnitude and phase, from which peak and valley signal level differences and phase changes can be identified to determine return loss changes and phase shifts indicative of DUT connection to the signal path. Based upon the results of such measurements, it can then be decided to proceed with testing, rework RF signal connections, confirm power has been applied, or take other action.

For example, such measurements enable a testing system to confirm connection, as well the quality of the connection, of a DUT. In turn, this further enables monitoring of the connection and connection quality, information about which can be used for scheduling of events, such as powering up a DUT that has been confirmed as properly connected, downloading any required firmware and initiating, or triggering, of testing by issuing appropriate test commands, etc., thereby minimizing down time in a production test environment. Also further enabled is tracking of events, such as compiling a DUT connection history and thereby allowing the test system to anticipate potential needs and timing for repairs or maintenance within the testing environment.

In accordance with an exemplary embodiment of the presently claimed invention, a test system for confirming radio frequency (RF) signal connection integrity with multiple devices under test (DUTs) to be tested concurrently includes: a plurality of signal ports for coupling to a plurality of DUTs to convey at least a portion of a plurality of outgoing RF signals and a plurality of reflection RF signals, wherein each one of said plurality of reflection RF signals is related to a respective one of said plurality of outgoing RF signals; signal routing circuitry responsive to a RF test signal by providing said plurality of outgoing RF signals, wherein each one of said plurality of outgoing RF signals corresponds to said RF test signal; and signal sensing circuitry coupled between said signal routing circuitry and said plurality of signal ports, and responsive to said at least a portion of said plurality of outgoing RF signals and said plurality of reflection RF signals by providing a plurality of outgoing sense signals and a plurality of reflection sense signals indicative of respective magnitudes of each one of said pluralities of outgoing and reflection RF signals, respectively.

In accordance with another exemplary embodiment of the presently claimed invention, a method of confirming radio frequency (RF) signal connection integrity with multiple devices under test (DUTs) to be tested concurrently includes: providing, for a plurality of DUTs, a like plurality of outgoing RF signals replicating a common RF test signal; sensing said plurality of outgoing RF signals to provide a plurality of outgoing sense signals indicative of respective magnitudes of each one of said plurality of outgoing RF signals; receiving a plurality of reflection RF signals, wherein each one of said plurality of reflection RF signals is related to a respective one of said plurality of outgoing RF signals; and sensing said plurality of reflection RF signals to provide a plurality of reflection sense signals indicative of respective magnitudes of each one of said plurality of reflection RF signals.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

The following discussion is in the context of concurrent testing of multiple DUTs. As will be readily appreciated, the system, techniques and principals as discussed below for testing multiple DUTs concurrently in accordance with exemplary embodiments of the presently claimed invention can be scaled for any multiple of DUTs, i.e., two or more.

Figure 1:
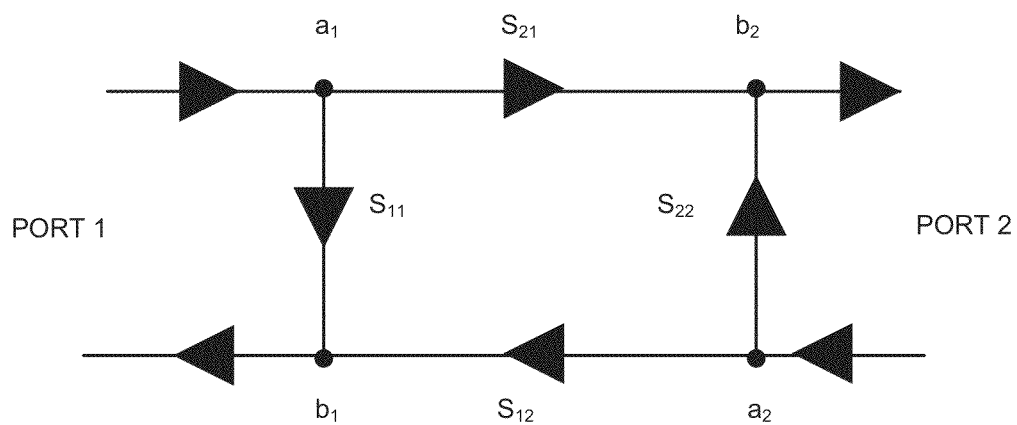
FIG. 1 depicts a basic signal flow graph for a RF signal network with its associated scattering perimeters.
Figure 2:
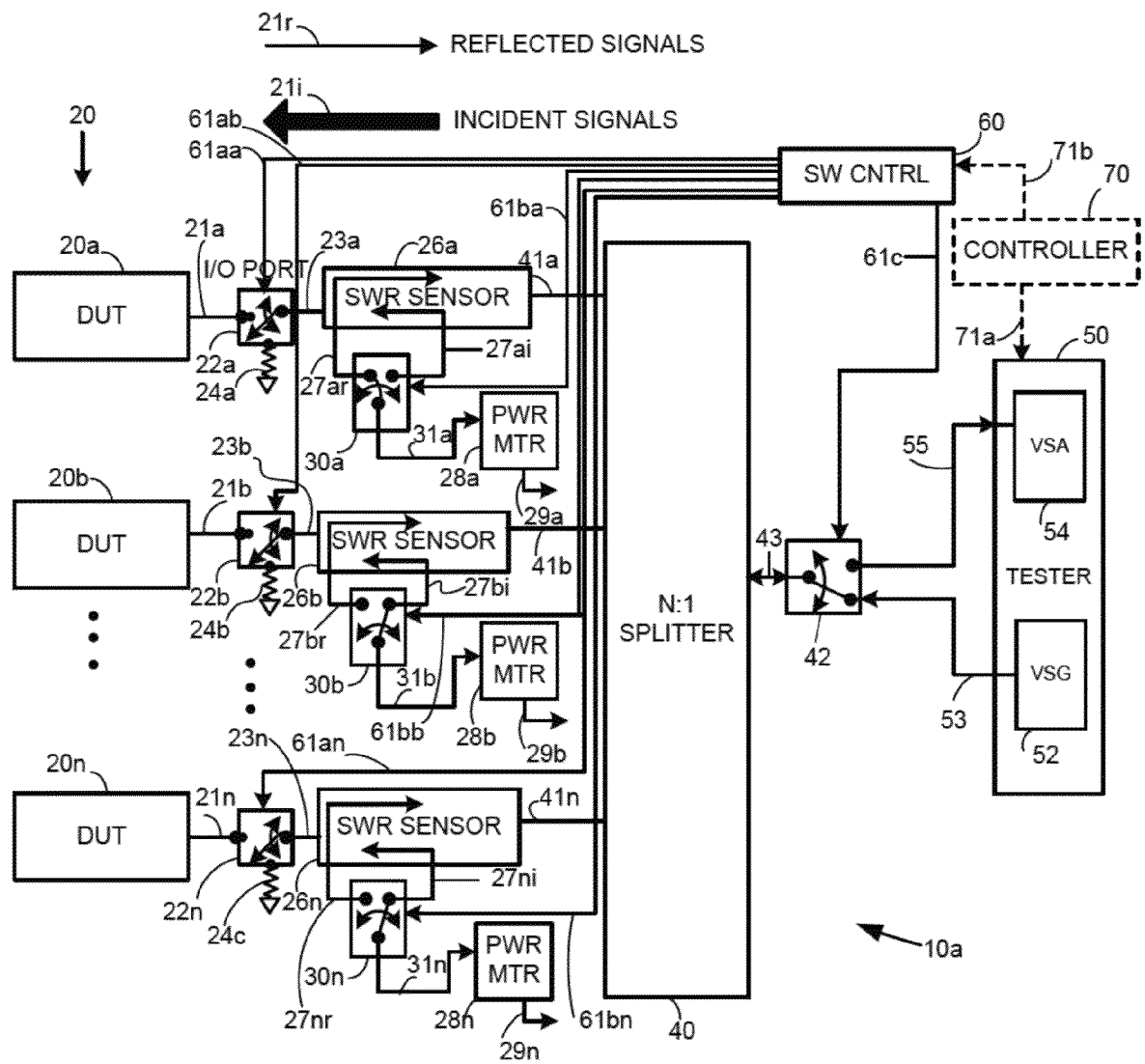
FIG. 2 depicts a test environment for testing multiple RF signal transceivers in accordance with an exemplary embodiment of the presently claimed invention.

Referring to FIG. 2, an exemplary embodiment of a test environment 10a for testing multiple DUTs 20 includes a tester 50 (which includes a signal source 52, e.g., a vector signal generator, or VSG, and a received signal analyzer 54, e.g., a vector signal analyzer, or VSA), signal routing circuitry 40, 42 (discussed in more detail below), standing wave ratio (SWR) sensors 26, power meters 28, sensor signal switches 30, DUT signal switches 22, and load circuits 24 having nominal real impedances equal to the characteristic RF circuit impedance (e.g., 50 or 75 ohms) The first routing circuit 40 can be implemented as one or more, or a combination, of multiplexing, switching, splitting and combining circuitry, while the second signal routing circuit 42 can be implemented as signal multiplexing or switching circuitry. Alternatively, a single routing circuit implementation can be used embodying the necessary signal combining and routing functions. Also, those elements depicted as signal switches can also be implemented using multiplexors in accordance with well-known techniques.

As currently depicted, the tester 50 includes a signal source 52 and signal analyzer 54, while external circuitry includes signal routing circuitry 40, 42, SWR sensors 26, power meters 28, additional switches 30, 22 and load impedances 24, plus corresponding signal connections (e.g., cables and connectors). Additionally, switch control circuitry 60 and, if desired, an external controller 70 can be included to complete the system. However, as will be readily appreciated, the tester 50 can be designed and implemented in accordance with well-known techniques to include all of these elements and functions, as desired.

During testing of the DUTs 20, the signal source 52 of the tester 50 provides a source signal 53, which is switchably provided to the first signal routing circuitry 40 (e.g., a N:1 signal combiner/splitter), which replicates the switched source signal 43 to provide multiple replica signals 41a, 41b, . . . , 41n. These replica signals 41 serve as the incident signals 21i to be conveyed to the multiple DUTs 20. During the actual testing, these replica signals 41 are conveyed via the SWR sensors 26 and DUT switches 22 to the DUTs 20 (e.g., during DUT receive, or RX, signal testing). During such testing, the DUT switches 22a, 22b, . . . , 22n, in accordance with switch control signals 61aa, 61ab, . . . , 61an from the switch controller 60, are configured to convey the replica signals 23a, 23b, . . . , 23n conveyed by the SWR sensors 26a, 26b, . . . , 26n to the respective DUTs 20a, 20b, . . . , 20n.

Also during this testing, if it is desirable to monitor the signal levels (e.g., power) of the incident signals 21i (e.g., for use in automatic level control of the source signal 53), the sensor switches 30a, 30b, . . . , 30n, in accordance with switch control signals 61ba, 61bb, . . . , 61an from the switch controller 60, can be switched to convey the respective incident sense signals 27ai, 27bi, . . . , 27ni from the SWR sensors 26a, 26b, . . . , 26n to the corresponding power meters 28a, 28b, . . . , 28n. In accordance with well-known techniques, these power meters 28 measure the incident sense signals 31a, 31b, . . . 31n provided by the switches 30 to provide corresponding measured incident sense signal data 29a, 29b, . . . , 29n, which are indicative of the signal levels (e.g., power) of the incident signals 21i provided in the form of the replica signals 41/23 to the DUTs 20.

Prior to or during this time that the DUTs 20 are being tested, the sensor switches 30, in accordance with their switch control signals 61ba, 61bb, . . . , 61an, convey reflected sense signals 27ar, 27br, . . . , 27nr to the power meters 28. The power meters 28 measure the switched reflected sense signals 31a, 31b, . . . , 31n to provide corresponding measurement data 29a, 29b, . . . , 29n, which are indicative of the levels (e.g., power) of any reflected signal components present during testing of the DUTs 20. In other words, these measurement data 29 are indicative of any portions of the incident replica source signals 23a, 23b, . . . , 23n provided to the DUTs 20a, 20b, . . . , 20n that are being reflected due to an open circuit, short circuit or mismatched impedance occurring in one of the DUT signal paths 21a, 21b, . . . , 21n or DUT 20, 20b, . . . , 20n.

For purposes of confirming connection integrity of the RF signal paths 21a, 21b, . . . , 21n to the DUTs 20 (as well as the input signal paths internal to the DUTs 20), the DUT switches 22a, 22b, . . . , 22n are switched (e.g., either before, between or after the incident and reflected signal measurements discussed above) so as to terminate the SWR sensors 26 with the load impedances 24, which, ideally, are non-inductive resistances shunted to circuit ground with values equal to the characteristic impedance of the DUTs (e.g., 50 or 75 ohms) As a result, the replica source signals 23a, 23b, . . . , 23n are terminated in characteristic load impedances 24, which should result in reflected signal components 21r having substantially smaller magnitudes as measured by the reverse, or reflected, signal sensing capabilities of the SWR sensors 26 (e.g., ideally zero, though some incident signal leakage may occur, thereby preventing attainment of a true zero measurement). To confirm this, and to establish individual reference reflected signal values based on the respective load, or termination, impedances 24a, 24b, . . . , 24n, the sensor switches 30 are switched so as to convey the reflected sense signals 27ar, 27br, . . . , 27nr to the power meters 28. As before, the power meters 28 measure these switched signals 31a, 31b, . . . , 31n, which are now the reflected sense signals, to provide reflected sense signal data 29a, 29b, . . . , 29n, which are indicative of the signal levels (e.g., power) of any reflected signal components 21r (e.g., due to non-zero $s_{11}$ components of the RF signal paths 21a, 21b, . . . , 21n to the DUTs 20 and/or the input signal paths internal to the DUTs 20). As discussed in more detail below, these reference reflected signal data can be compared with the reflected signal data measured during RX testing of the DUTs 20.

Figure 3:
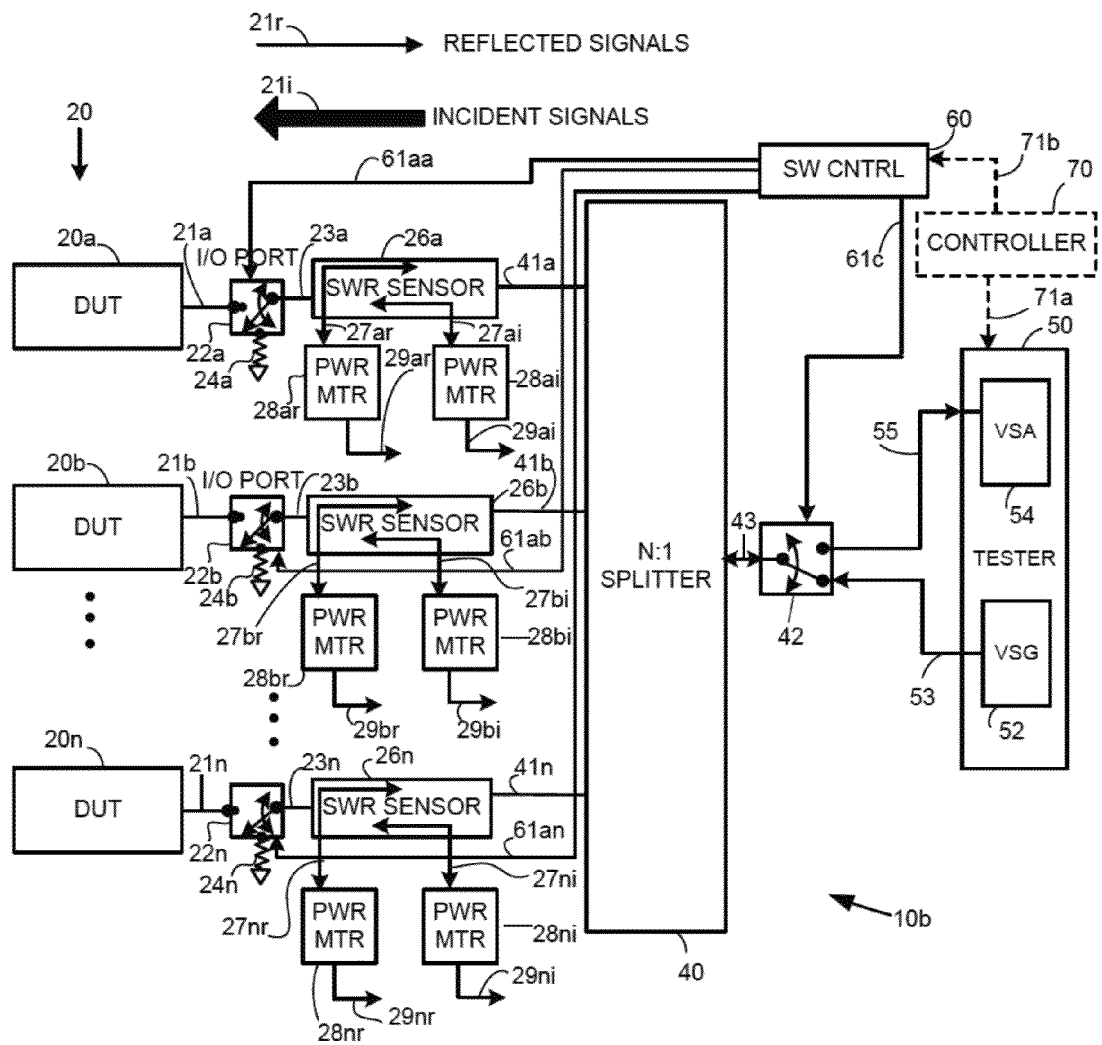
FIG. 3 depicts a test environment for testing multiple RF signal transceivers in accordance with another exemplary embodiment of the presently claimed invention.

Referring to FIG. 3, another exemplary embodiment of the testing environment 10b includes power meters 28ai, 28bi, . . . , 28ni specifically for the incident sense signals and power meters 28ar, 28br, . . . , 28nr specifically for the reflected sense signals as provided by the SWR sensors 26a, 26b, . . . , 26n, as discussed above. As before, the measured incident sense signal data 29ai, 29bi, . . . , 29ni and measured reflected sense signal data 29ar, 29br, . . . , 29nr are provided and are indicative of the signal levels of the incident 21i and reflected 21r signals, respectively.

Figure 4:
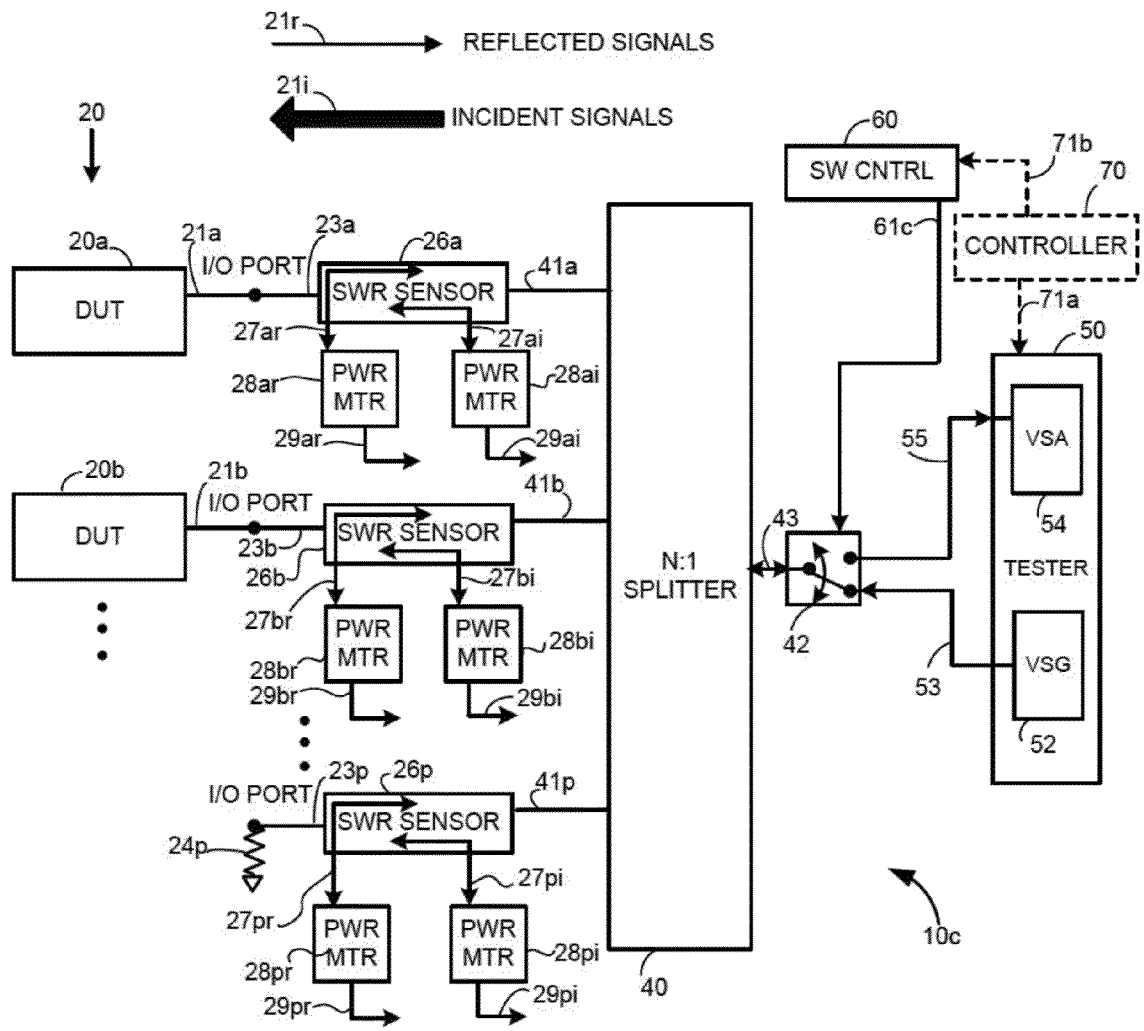
FIG. 4 depicts a test environment for testing multiple RF signal transceivers in accordance with another exemplary embodiment of the presently claimed invention.

Referring to FIG. 4, another exemplary embodiment of the testing environment 10c includes separate power meters 28ai, 28bi, . . . , 28ar, 28br, . . . , as discussed above for the test environment 10b of FIG. 3. However, the replica source signals 23a, 23b, . . . conveyed by the SWR sensors 26a, 26b, . . . are provided via the signal paths 21a, 21b, . . . directly to the DUTs 20a, 20b, . . . without intervening DUT switches 22 and load impedances 24 (FIGS. 2 and 3). Instead, the incident 21i and reflected 21r signals are monitored by the SWR sensors 26 with corresponding power meter data 29 provided that is indicative of the signal levels of the incident 21i and reflected 21r signals, as discussed above. In this test environment 10c, reference incident 29pi and reflected 29pr signal level data for comparison against measured incident 29ai, 29bi, . . . and reflected 29ar, 29br, . . . signal data, respectively, for the DUT test signals are provided using a separate SWR sensor 26p and load impedance 24p. As before, the SWR sensor 26p provides an incident sense signal 27pi and a reflected sense signal 27pr for measurement by respective power meters 28pi, 28pr to provide reference measured incident signal data 29pi and reference measured reflected signal data 29pr. (Alternatively, a shared power meter with a switch can be used, as depicted in the test environment 10a of FIG. 2.)

Figure 5:
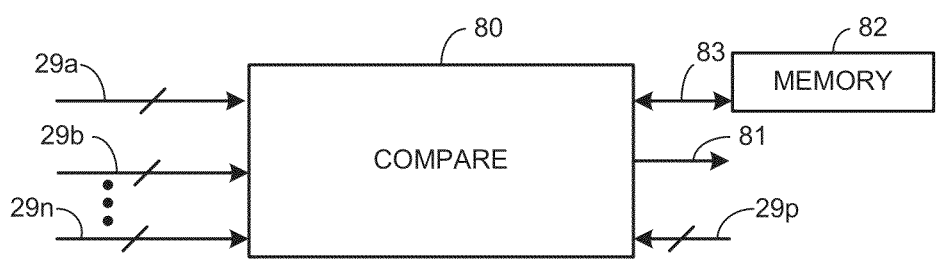
FIG. 5 depicts circuitry for comparing and storing measured signal data for incident and reflected signals in accordance with exemplary embodiments of the presently claimed invention.

Referring to FIG. 5, circuitry for monitoring the various measured signal data can include comparison circuitry 80 and memory circuitry 82, interconnected substantially as shown.

When used with the test environment 10a of FIG. 2, the comparison circuitry 80 can receive and compare the measured signal data 29a, 29b, . . . , 29n, which includes data indicative of the signal levels of the incident 21i and reflected 21r signal components passing through the SWR sensors 26a, 26b, . . . , 26n while the replica source signals 23a, 23b, . . . , 23n are being conveyed to their respective load impedances 24*a*, 24*b*, ..., 24*c* and DUTs 20*a*, 20*b*, ..., 20*n*, as discussed above. These measured signal data can be compared against predetermined or predefined signal thresholds. When one or more of these measured signal data are indicative of one or more such signal thresholds being transcended, or crossed (i.e., where ether the measured signal data value changes from less than to greater than or from greater than to less than a signal value threshold, such as may occur upon insertion or connection of a DUT 20 to the testing environment 10 and/or initial application of power to a DUT 20), one or more signals 81 can be provided for various uses or purposes, such as recording the event, initiating or triggering testing of the DUTs 20, or alerting the tester 50, controller 70 (FIGS. 2-4) or test operator (not shown) for use in initiating or otherwise controlling progress of the test sequence (discussed in more detail below). The memory circuitry 82 can be used to store the measured signal data and test results for later use as desired (e.g., for monitoring conditions of the testing environment over time, as discussed in more detail below).

In the test environment 10*b* of FIG. 3, the comparison circuitry 80 can be used in a similar manner. In this case, the received measured signal data 29*a*, 29*b*, ..., 29*n* includes the measured incident signal data 29*ai*, 29*bi*, ..., 29*ni* and reflected signal data 29*ar*, 29*br*, ..., 29*nr*.

In the test environment 10*c* of FIG. 4, the comparison circuitry 80 can be used in a similar manner, with the additional reception of the measured reference incident signal data 29*pi* and measured referenced reflected signal data 29*pr*. As before, these measured signal data can be compared and used to determine whether predetermined or predefined signal thresholds have been crossed, thereby indicating likelihood of a shorted or open DUT signal path or mismatched impedance within the signal path or DUT.

In accordance with further exemplary embodiments, measurements involving reflected RF signals can be used in other ways to determine connectivity of a DUT to a test signal path.

Figure 6:
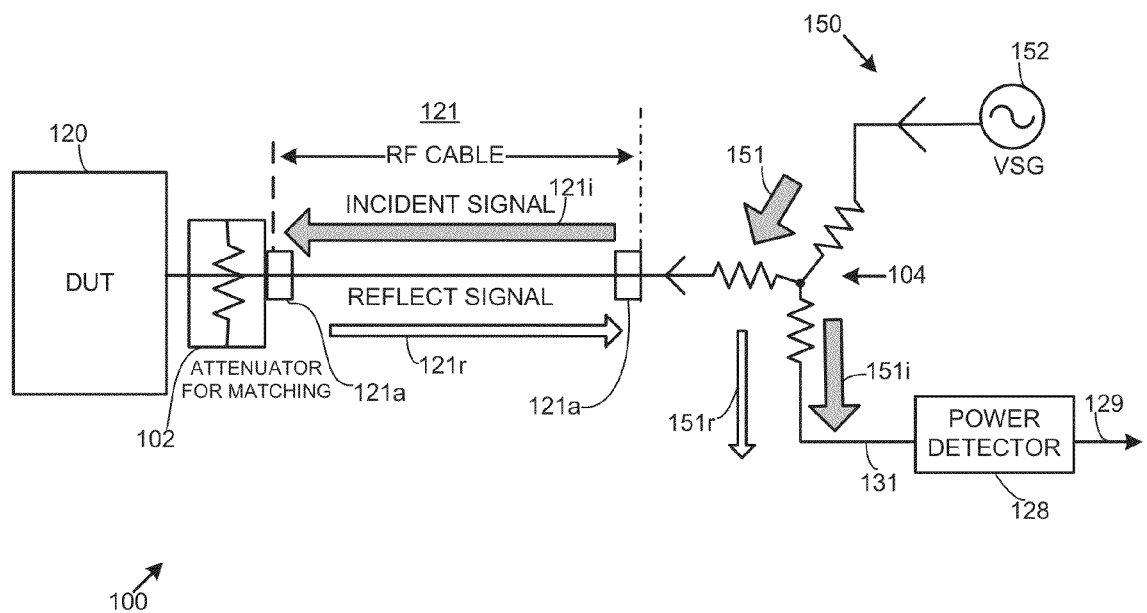
FIG. 6 depicts a test environment for testing one or more RF signal transceivers in accordance with another exemplary embodiment of the presently claimed invention.

Referring to FIG. 6, in a typical testing environment 100, as discussed above, the tester 150 includes a VSG 152 which provides the RF test signal 151 for testing a DUT 120. This test signal 151 is conveyed to the DUT 120 via signal splitting and combining circuitry 104 and a cabled signal path 121 (electromechanically coupled to the tester 150 and DUT by connectors 121*a*). (As will be readily appreciated by those skilled in the art, the signal splitting and combining circuitry 104 provides signal coupling similar to that provided by the SWR sensors 26 (FIGS. 2-4) though without need for directivity of the coupled signals.) Also, a RF signal attenuator 102 is often used in series between the signal path 121 and DUT 120 for purposes of improved impedance matching as between the DUT 120 and the signal path 121 and tester 150.

In accordance with well-known principles, in response to the incident signal 121*i*, impedance mismatch between the signal path 121 and DUT 120 (and the attenuator 102) causes a reflected signal 121*r* to be produced. This reflected signal 121*r* is divided in the signal combining and splitting circuitry 104, thereby producing a reflected signal component 151*r* that combines with a divided incident signal component 151*i* to produce a combined RF signal 131 that is detected and measured by a power detector 128. As discussed in more detail below, measurements of this combined signal 131 by the power detector 128 produce a measured power signal 129 indicative of the amplitude and phase of the measured RF signal 131. Depending upon whether the DUT 120 is connected, the magnitude and phase of the reflected signal 121*r* and its measured component 151*r* will be different, and can be sensed, or measured, to detect the connection, proper or improper, of the DUT 120 within the testing environment 100.

Of potential concern for testing purposes is the fact that the incident 151*i* and reflected 151*r* signal components originate from the same source and, therefore, are correlated. Accordingly, when they are in phase, the power detector 128 will see the sum 131 of these signals 151*i*, 151*r*. When they are out of phase, the combined signal 131 can range from a partial sum to a full difference between the magnitudes of these signals 151*i*, 151*r*, depending upon their mutual phase difference.

For example, if a 6 dB signal attenuator 102 is used, the RF signal cable 121 has a return loss of 15 dB, and the incident signal 121*i* provided by the VSG 152 has a signal power of −10 dBm, return loss without the DUT 120 connected is proximately 12 dB, while, with the DUT 120 connected, system return loss is dominated by the RF cable 121 at approximately 15 dB. For the simple example of the incident 151*i* and reflected 151*r* signal components being mutually aligned in phase, the power detector 128 will measure a lower power when the DUT 120 is connected (−10 dBm-15 dB=−25 dBm), versus when the DUT 120 is not connected (−10 dBm-12 dB=−22 dBm). In other words, before the DUT 120 is connected, the reflected signal 121*r* is not in phase with the incident signal 121*i*, but following connection of the DUT 120, the reflected signal 121*r*, though smaller, is now in phase with the incident signal 121*i*, thereby producing a higher power reflection signal 131 being measured by the power detector 128. Hence, the detected power of the reflected signal 131 depends upon signal phase as well as signal return losses.

Alternatively, in place of the signal combining and splitting circuitry 104, a directional coupler can be used, in which case in the incident signal component 151*i* is not present, leaving only the reflected signal component 151*r* to be measured by the power detector 128. This improves testing, since the reflected signal component can be isolated for measurement. However, the measurement capability will still be limited by the overall system return loss. Therefore, if the system return loss is not dominated by that of the DUT 120 (e.g., there is a better matching attenuator 102 connected in series with the DUT 120, which provides a better return loss than the RF cable 121 and tester 150 combined), the tester 150 may not be able to determine whether or when the DUT 120 is connected. However, in accordance with further embodiments of the presently claimed invention, the signal phases of the incident 121*i* and reflected 121*r* signals can be controlled in such a way as to allow the power detector to determine the connection and absence of the DUT 120 in the testing environment 100, irrespective of system return losses due to the RF cable 121, DUT 120 and signal attenuator 102. As discussed in more detail below, phase control of the incident and reflected signals can be effectively achieved by varying the frequency of the incident signal over a minimum frequency range related to the effective wavelength of the test signal path.

Figure 7:
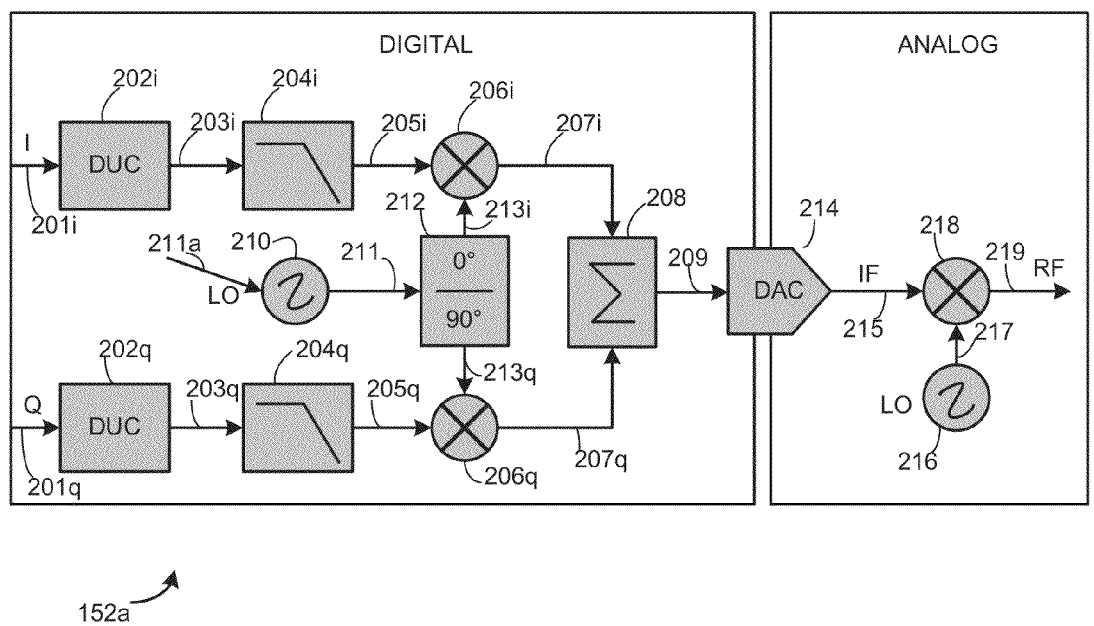
FIG. 7 depicts exemplary VSG circuitry.

Referring to FIG. 7, a typical VSG 152*a* includes digital and analog sub-systems. The in-phase 201*i* and quadrature-phase 201*q* signals are processed by respective digital up converters (DUCs) 201*i*, 202*q*, low pass filters 204*i*, 204*q* and mixers 206*i*, 206*q*. The frequency up-converted signals 203*i*, 203*q* are filtered by the low pass filters 204*i*, 204*q*. The filtered signals 205*i*, 205*q* are further converted up in frequency by the mixers 206*i*, 206*q* using respective in-phase 213*i* and quadrature-phase 213*q* RF signals provided by a phase shifter 212 and based on a local oscillator (LO) signal 211 provided by a LO signal source 210. The resulting up-converted signals 207*i*, 207*q* are combined in signal summing circuitry 208. The combined signal 209 is converted from its digital form to an analog signal 215 by a digital-to-analog converter (DAC) 214. The resulting analog intermediate frequency (IF) signal is further up converted in frequency by a mixer 218 in accordance with another LO signal 217 provided by another LO signal source 216. The resulting RF signal 219 serves as the VSG output signal 151 (FIG. 6).

As noted above, the signal phases of the incident 121$i$ and reflected 121$r$ signals (FIG. 6) can be effectively controlled by sweeping the frequency of the VSG output signal 219. While changing the frequency of the carrier signal 217 is relatively slow, the frequency of the in-phase 201$i$ and quadrature-phase 201$q$ baseband signals can be easily controlled (e.g., by sweeping the frequency of the digital data waveform) to sweep across a frequency range within the baseband bandwidth of the VSG 152$a$. The baseband signal alone can be swept in frequency, or, alternatively or in addition, the IF LO signal 211 can also be swept in frequency (e.g., in accordance with a control signal 211$c$) in accordance with well-known techniques.

Figure 8:
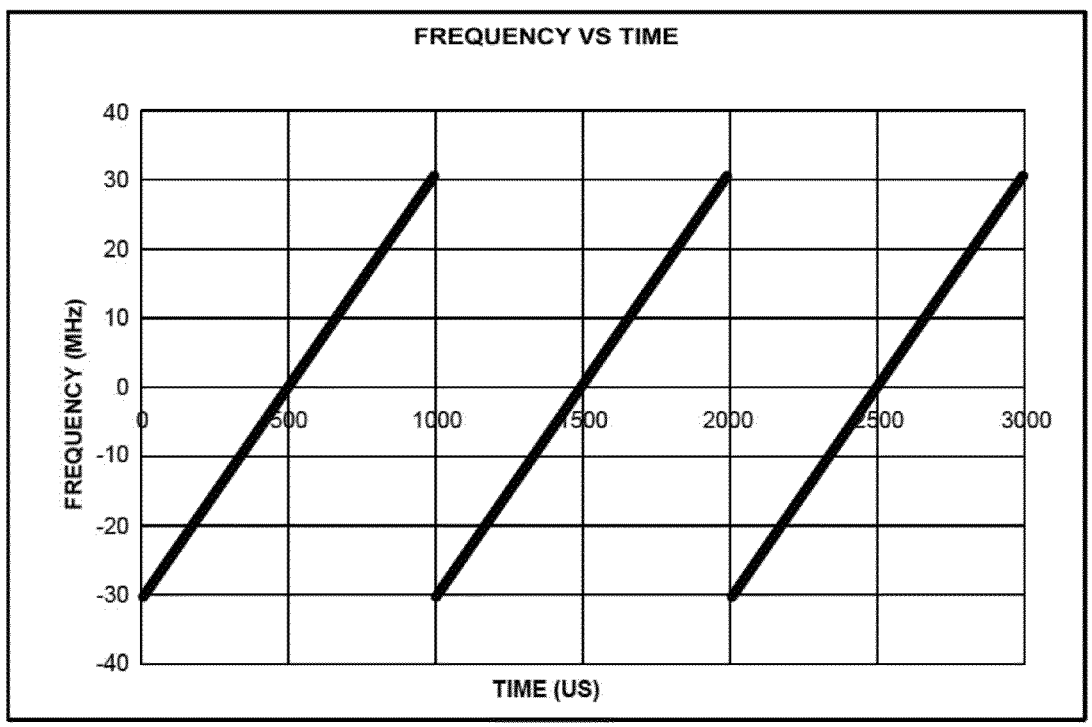
FIG. 8 depicts a VSG signal being swept in frequency.

Referring to FIG. 8, in accordance with an exemplary embodiment, the output signal 219 can be varied in frequency versus time as shown. In accordance with exemplary embodiments, this signal 219 would be a sine wave having a constant amplitude. As shown for this example, its frequency is a function of time having a signal period of 1000 microseconds during which the frequency range spans 60 MHz.

As discussed above, the tester 150 and DUT 120 will be connected via a test cable 121. This cable 121 will have a physical length and an effective length in terms of signal wavelength in accordance with various physical characteristics of the cable (as is well-known in the art). With respect to the frequency range of the test signal, such signal, when at the lower frequency, will propagate through the cable and go through N signal cycles for which such number N will be determined by double the effective cable length for the reflected signal 121$r$. At the higher frequency, due to the shorter signal wavelength, the test signal will pass through more, e.g., N+M, signal cycles. If the incident 151$i$ and reflected 151$r$ signal components are in phase at the power detector 128 for the frequency at which the signal went through N signal cycles, such signal components 151$i$, 151$r$ will also be in phase at the power detector 128 at the frequency for which the test signal goes through N+1 signal cycles. Accordingly, since the frequency sweep is preferably continuous over the frequency range generating N signal cycles through N+1 signal cycles, the incident 151$i$ and reflected 151$r$ signal components will go through signal states including in-phase, null, or cancelled, phase, and all phases in between.

Figure 9:
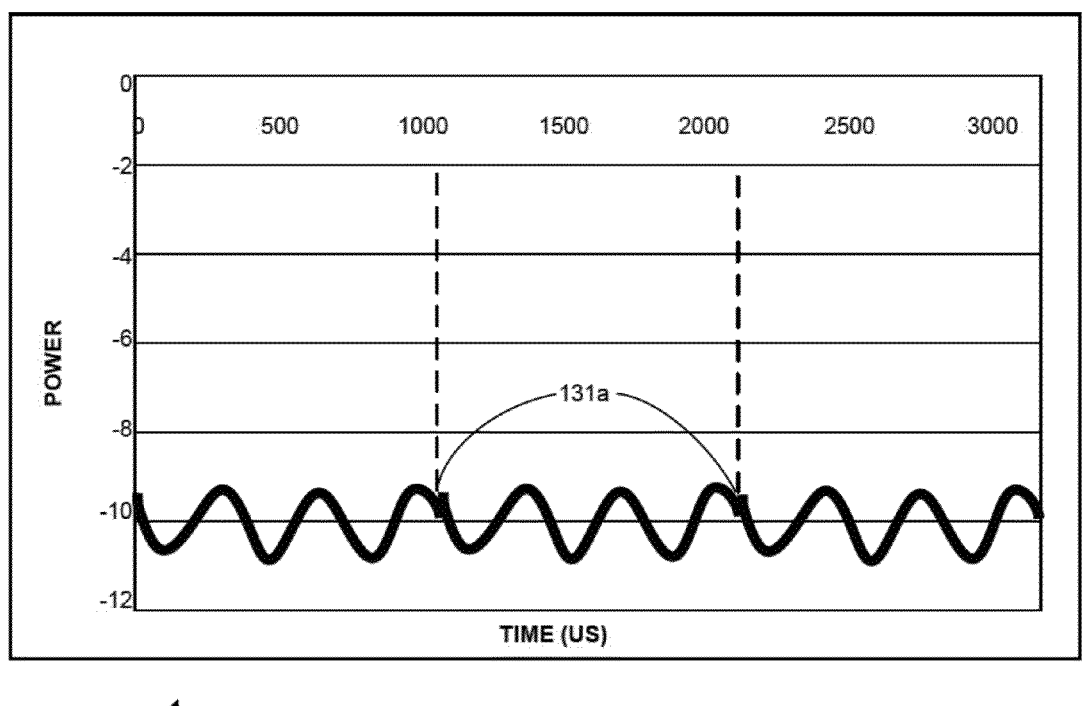
FIGS. 9-13 depict measured power for reflected signals while sweeping the frequency of the incident signal during testing of a DUT in accordance further exemplary embodiments of the presently claimed invention.

Referring to FIG. 9, the resulting cycling effect causes the combined signal 131 to have incident 151$i$ and reflected 151$r$ signal components in phase, cancelled, in phase, cancelled, and so on, as shown. This results in a power reading as a function of time, as shown. Due to a designed signal pattern, this is effectively signal power versus signal frequency, with two types of signal periods. For the exemplary embodiment of a signal sweep period of 1000 microseconds, the resulting power measurement has three power signal periods over 3000 microseconds, which are caused by the frequency sweep period. Within one larger period, we can see cycling which is dominated by the frequency range being swept and length of the test cable 121. (Alternatively, the frequency sweep can be done such that the frequency alternates between increasing and decreasing between the minimum and maximum frequencies, e.g., as a triangular sweep waveform rather than the sawtooth sweep waveform as depicted.)

For example, assume the VSG baseband bandwidth is 80 MHz, with a nominal center transmitting frequency of 6000 MHz. The signal is swept, as depicted in FIG. 8, using the 60 MHz of baseband frequency range, thereby producing an output signal sweeping between 5970 and 60300 MHz as a function of time. For this example, it is assumed the test cable 121 has a physical length of 1.5 meter with a propagation speed of 66%, thereby resulting in effective wavelengths of 3.32 centimeters for 5970 MHz and 3.28 centimeters for 6030 MHz. Accordingly, the round trip for the reflected signal component 151$r$ is three meters, or 300 centimeters. Therefore, the reflected signal component 151$r$ will have gone through $300/3.28=91.5$ cycles at 6030 MHz, and $300/3.345=90.4$ cycles for 5970 MHz. Since this is at least one full signal cycle, the incident 151$i$ and reflected 151$r$ signal components will go through every phase relationship, including peaks and valleys.

For a test system having a system return loss as good as 15 dB, with or without a DUT 120 connected, the voltage standing wave ratio (VSWR) is 1.43. This will produce a combined signal 131 having signal peaks and valleys with a difference of 3.1 dB, which can be easily observed by a conventional power detector 128. By measuring these signal 131 peaks and valleys, the return loss of the system can be determined (since the system return loss will be substantially constant over the frequency range being swept). Accordingly, any return loss change caused by connection of a DUT 120 will be reflected by a change in the measured signal 131 power.

Figure 10:
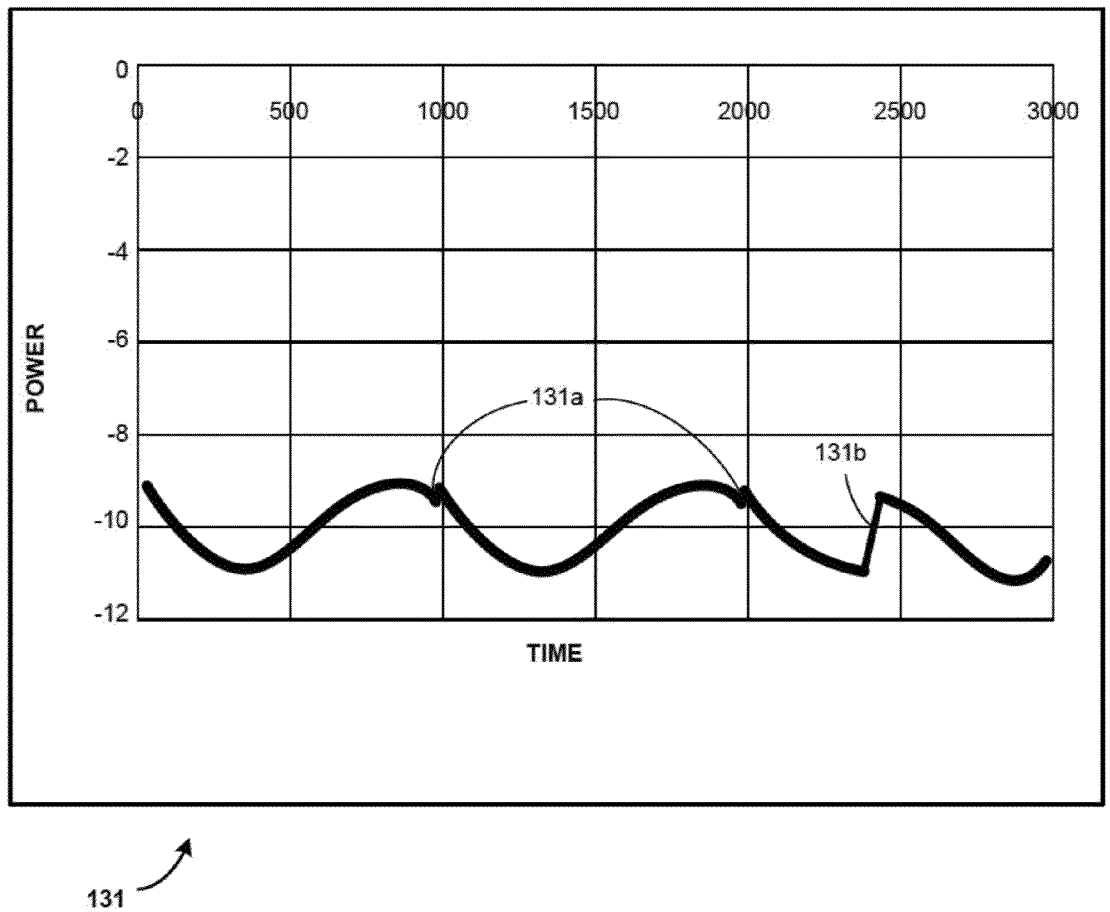

Referring to FIG. 10, when the system return loss is dominated by one or more factors other than the DUT 120, connection of a DUT 120 to the test cable 121 may not result in a sufficient difference in the measured power reading. However, connection of the DUT 120 should still cause a change in the phase of the reflected signal component 151$r$. Such a phase change, in turn, will change the position of the peaks and valleys of the measured signal 131 power. As shown, during the third power reading cycle there is an abrupt change 131$b$. This, in turn, causes the signal power peaks and valleys to shift in time. The resulting abrupt power reading change, therefore, is indicative of the connection of the DUT 120, which causes such system signal phase change.

By measuring the combined signal 131 power over multiple cycles, and correlating at least two frequency sweep cycles, the phase change caused by connection of the DUT 120 can be determined due to the shift in the signal power peaks and valleys. For example, when the frequency sweep and cable loss are generating more than one period of signal ripple, this correlation can be as easy as correlating the peak and valley positions (which are related to the signal frequency). For an extreme case where connection of the DUT 120 causes the phase to invert (shift by 180 degrees), the power detector 128 will see the peaks and valleys exchange positions, i.e., a peak becomes a valley and a valley becomes a peak.

Figure 11:
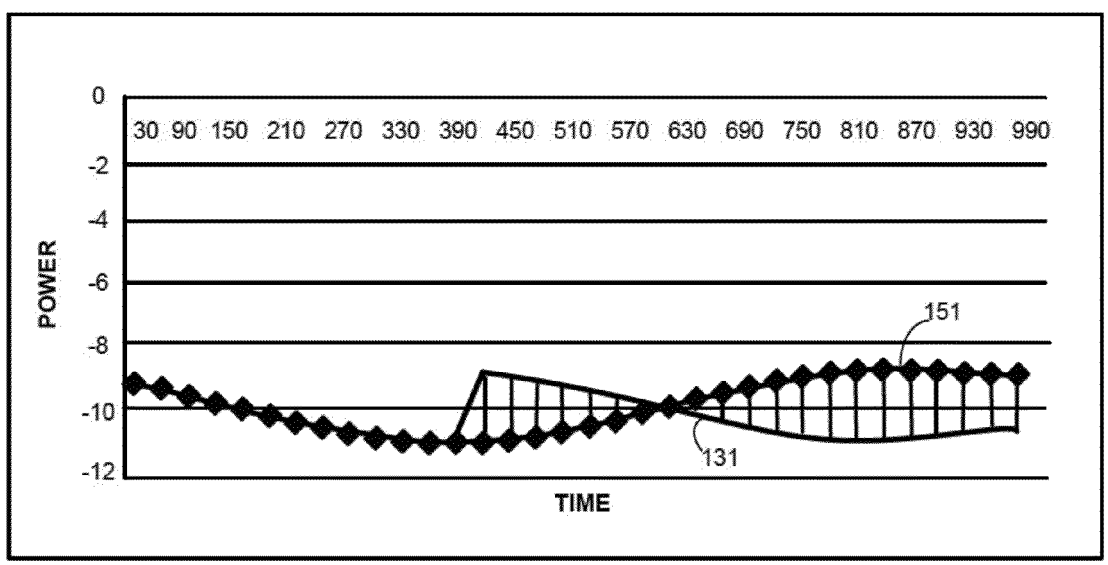

Referring to FIG. 11, a graph of such a correlation would appear as shown. For this example, this is a correlation of the first and third periods of the measured power signal of FIG. 10.

Based upon the foregoing discussion, it should be understood that while sweeping the baseband signal frequency of the VSG 152 (and without the need for altering the carrier frequency), the combined signal 131 containing the incident 151$i$ and reflected 151$r$ signal components can be monitored and correlated over multiple measurement cycles in the time domain (which, for the designed signal, corresponds to a frequency response) to detect return loss and signal phase changes caused by connection of a DUT 120. Such detection of the DUT connection can be used as a trigger to initiate the test sequence, thereby avoiding wasted test time by running a test sequence prior to connection of a DUT 120, or following connection of a defective DUT 120.

Figure 12:
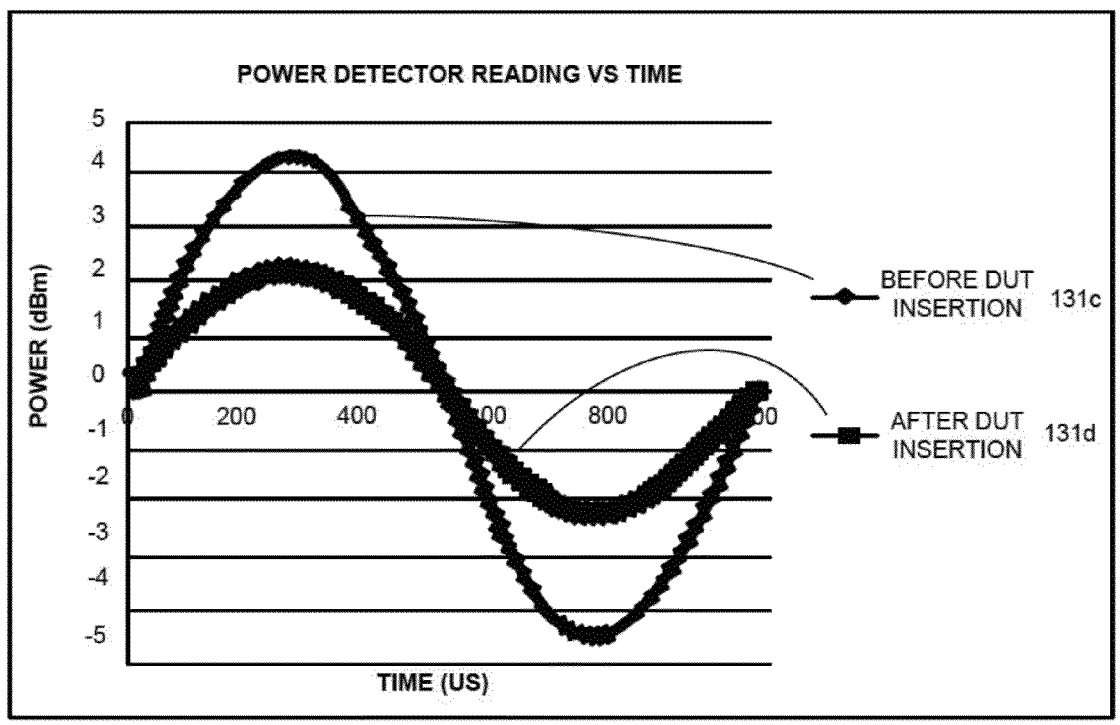

Referring to FIG. 12, in accordance with one example test environment 100 (FIG. 6), assume a perfect 6 dB signal attenuator 102 is used. Prior to connection of the DUT 120, the system return loss is 12 dB. With the DUT 120 connected, the system return loss improves to 18 dB. (The tester 150 is assumed to be providing a 0 dBm incident signal 121i.) The phase of the reflected signal 121r does not change due to connection of the DUT 120. This results in no phase change between measurements. The 12 dB return loss produces a VSWR of approximately 1.67 and the resulting standing wave will generate a power reading change of greater than 4 dB (20*log 1.67). When the system return loss improves to 18 dB due to connection of the DUT 120, the standing wave change is approximately 2.2 dB.

Figure 13:
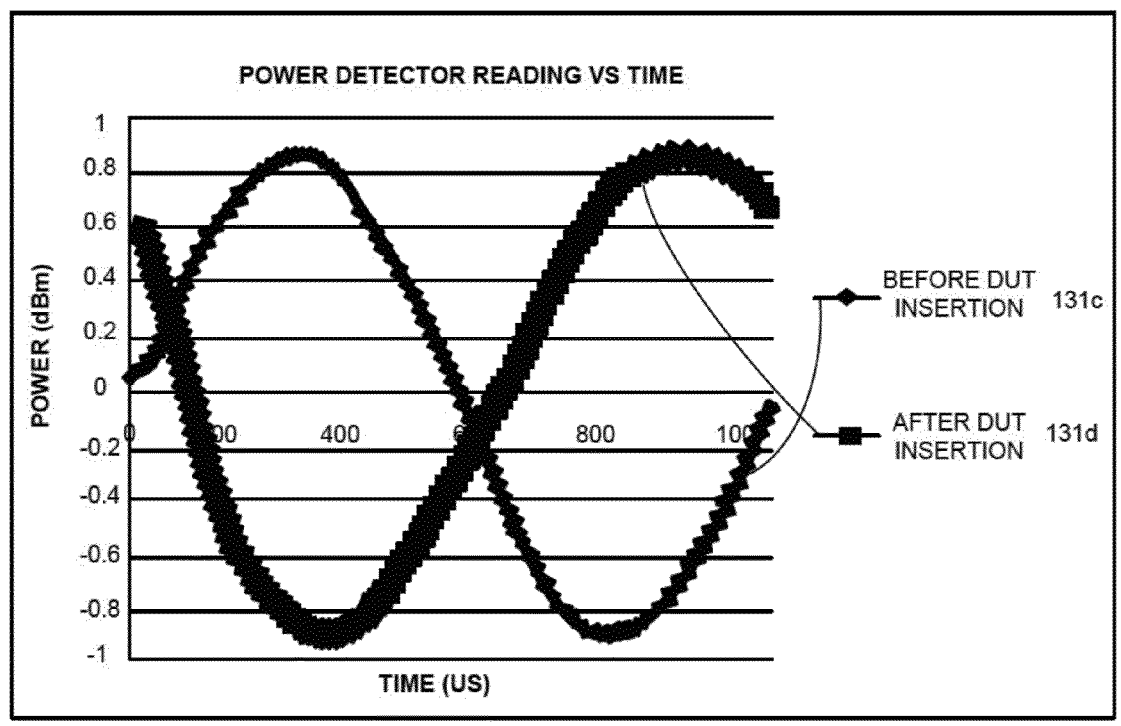

Referring to FIG. 13, in accordance with another example, assume a perfect 10 dB signal attenuator 102 is used. This produces a system return loss of approximately 20 dB without a DUT 120 connected. In this case, the test cable 121 and other connections will dominate the system performance, so connection of the DUT 120 does not sufficiently improve system return loss. However, connection of the DUT 120 does result in a phase shift of 270 degrees (3*π/4 radians). The 20 dB return loss translates to a VSWR of approximately 1.22 and produces a peak-to-peak swing in power detector 128 measurement of approximately 1.7 dB. As shown, the phase change can be easily observed by correlating the power detector measurement results before and after connection of the DUT 120.

Based upon the foregoing discussion, it can be seen that the various exemplary combinations of circuit elements, test system architectures and testing techniques provide for rapid, reliable and versatile detection of various states as well as changes in such states of a RF signal transceivers testing environment. For example, by detecting magnitudes and phases of reflected signals in such a testing environment, it can be determined whether and when the RF signal ports of a DUT have been connected or disconnected, the DUT has its power applied or removed, or an operational status of a portion of a DUT is faulty or has changed. Further, by monitoring the states and changes in states over time, changes in the testing environment itself can be detected (e.g., connecting and disconnecting of test equipment, powering on and off of test equipment, and deteriorating return losses due to wearing of or damage to RF signal connectors or cabling).

These detections of such states and changes in states of the testing environment can then be acted upon as part of or in furtherance of the testing being performed. For example, following the mechanical completion of the RF signal connection and powering on of a DUT, the state of any measured reflected signals (e.g., magnitude or phase, or both) can be used to determine whether the connection and powering on was successful, and even if successful, whether such connection is showing signs of deterioration or the DUT failed to power up properly. Based upon the results of such measurements, it can then be decided (e.g., in real time by a test operator, or in accordance with rules set forth in an automated test program) to proceed with testing (e.g., load firmware, apply and measure RF test signals, measure DC operating characteristics, etc.), rework or replace the RF signal connection, confirm that power has been properly applied, or take other action as deemed appropriate, necessary or otherwise potentially helpful in view of the measurement results.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of confirming radio frequency (RF) signal connection integrity with one or more devices under test (DUTs), comprising:
    providing one or more cabled signal paths for conveying a respective one or more RF signals, including one or more outgoing RF signals and one or more reflection RF signals, wherein each one of said one or more reflection RF signals is related to a respective one of said one or more outgoing RF signals;
    providing, for one or more DUTs via said one or more respective cabled signal paths, said one or more outgoing RF signals having a nominal outgoing RF signal frequency varying over a frequency range including minimum and maximum nominal outgoing RF signal frequencies; and
    receiving one or more reflection RF signals via said one or more respective cabled signal paths and in response thereto providing one or more measured reflection signals indicative of one or more of
        a respective signal magnitude versus time of each one of said one or more reflection RF signals, and
        a respective signal phase versus time of each one of said one or more reflection RF signals.

2. The method of claim 1, wherein said providing one or more cabled signal paths for conveying a respective one or more RF signals comprises providing each one of said one or more cabled signal paths with a respective effective cable length of N signal cycles at said minimum nominal outgoing RF signal frequency and at least N+0.5 signal cycles at said maximum nominal outgoing RF signal frequency.

3. The method of claim 1, wherein said providing said one or more outgoing RF signals comprises:
    generating one or more baseband signals; and
    converting said one or more baseband signals to said one or more outgoing RF signals.

4. The method of claim 3, wherein said generating one or more baseband signals comprises generating said one or more baseband signals with:
    a minimum nominal baseband signal frequency related to one of said minimum and maximum nominal outgoing RF signal frequencies; and
    a maximum nominal baseband signal frequency related to another of said minimum and maximum nominal outgoing RF signal frequencies.

5. The method of claim 3, wherein said converting said one or more baseband signals to said one or more outgoing RF signals comprises:
    converting said one or more baseband signals to one or more intermediate frequency (IF) signals; and
    converting said one or more IF signals to said one or more outgoing RF signals.

6. The method of claim 5, wherein said converting said one or more baseband signals to one or more intermediate frequency (IF) signals comprises providing said one or more IF signals with:

a minimum nominal IF signal frequency related to one of said minimum and maximum nominal outgoing RF signal frequencies; and a maximum nominal IF signal frequency related to another of said minimum and maximum nominal outgoing RF signal frequencies.

7. The method of claim 1, further comprising:

receiving one of said one or more reflection RF signals via one of said one or more respective cabled signal paths prior to a connection of one of said one or more DUTs to said one of said one or more respective cabled signal paths;

receiving said one of said one or more reflection RF signals via said one of said one or more respective cabled signal paths following said connection of said one of said one or more DUTs to said one of said one or more respective cabled signal paths; and comparing corresponding ones of said measured reflection sense signals from prior to and following said connection of said one of said one or more DUTs to said one of said one or more respective cabled signal paths.

8. The method of claim 7, wherein said comparing corresponding ones of said measured reflection sense signals from prior to and following said connection of said one of said one or more DUTs to said one of said one or more respective cabled signal paths comprises comparing one or more of said:

respective signal magnitudes versus time from prior to and following said connection, and respective signal phase versus time from prior to and following said connection.

\* \* \* \* \*